United States Patent [19]

Umemura

[11] Patent Number: 4,983,025
[45] Date of Patent: Jan. 8, 1991

[54] MAGNETO-OPTICAL THIN FILM

[75] Inventor: Shizuo Umemura, Kanagawa, Japan

[73] Assignee: Fuji Photo Film Co., Ltd., Minami Ashigara, Japan

[21] Appl. No.: 304,651

[22] Filed: Feb. 1, 1989

[30] Foreign Application Priority Data

Feb. 5, 1988 [JP] Japan .................................. 63-25488

[51] Int. Cl.$^5$ ............................................. G02F 1/09
[52] U.S. Cl. .................................... 350/377; 360/114; 360/135
[58] Field of Search ............... 350/377, 375, 376, 378; 360/131, 114, 135; 365/122

[56] References Cited

U.S. PATENT DOCUMENTS

| | | | |
|---|---|---|---|
| 3,472,575 | 10/1969 | Hunt | 350/377 |
| 3,650,601 | 3/1972 | Bierlein | 350/377 |
| 4,525,028 | 6/1985 | Dorschner | 350/377 |
| 4,556,291 | 12/1985 | Chen | 350/377 |
| 4,637,953 | 1/1987 | Sawamura et al. | 350/377 |

FOREIGN PATENT DOCUMENTS 2020842 11/1979 United Kingdom ................ 350/377

OTHER PUBLICATIONS

Keay et al, "Longitudinal Kerr Magneto-Optic Effect in Multilayer Structures of Dielectric and Magnetic Films," *Optica Acta*, 1968, vol. 15, No. 4, pp. 373–388.
Stoffel, "Thin-Film Magneto-Optic Read-Write Memory Element," *IBM Technical Disclosure Bulletin*, vol. 12, No. 1, Jun. 1969, pp. 209–210.
Thompson, "NDRO Device," *IBM Technical Disclosure Bulletin*, vol. 12, No. 9, Feb. 1970, pp. 1450–1451.

*Primary Examiner*—Bruce Y. Arnold
*Assistant Examiner*—Martin Lerner
*Attorney, Agent, or Firm*—Sixbey, Friedman, Leedom & Ferguson

[57] ABSTRACT

A magneto-optical thin film comprising a substrate having thereon at least two ferromagnetic thin layers alternating with at least two dielectric thin layers to form a laminate the ferromagnetic thin layers each having a thickness of from 30 to 260 Å.

7 Claims, 3 Drawing Sheets

MAGNETO-OPTICAL THIN FILM

FIELD OF THE INVENTION

The present invention relates to a magneto-optical thin film for rotating the plane of polarization of light which is useful in such applications as lightguide communications capable of high-volume transmission of information and magneto-optical recording suitable for high-density recording of information. In particular, the present invention relates to a magneto-optical thin film having enhanced magneto-optical effects which is suitable for use in magneto-optical recording media.

BACKGROUND OF THE INVENTION

Ferromagnetic materials that are known to be usable in magneto-optical recording media include amorphous alloys of a rare earth element and transition metal system such as TbFeCo and GdCo, polycrystalline alloys such as MnBi, MnCuBi and PtCo, and cobalt ferrite and iron garnet. The polycrystalline materials have not yet been commercialized because the grains in the thin film form are not small enough to suppress noise in read signals and because of their low recording sensitivity. Therefore, most of the efforts currently made to commercialize magneto-optical recording media are based on the use of thin films of amorphous alloys of the rare earth/transition metal system which exhibit superior overall characteristics. However, these amorphous alloys do not have sufficiently large magneto-optical effects to provide reasonably high signal-to-noise ratios. The Kerr rotation angles, for example, are small. Therefore, attempts are being made to enhance their magneto-optical effects of these amorphous alloys by various means, including forming a two- or three-layered structure containing not only the amorphous alloy layer but also a dielectric layer having an appropriate refractive index, as described, for example, in Ohta et al., Reference Material for the 27th Annual Meeting of The Magnetics Society of Japan, p. 57; and Inoue et al., Summary of the Proceedings of the 8th Conference of The Magnetics Society of Japan, p. 141.

In recent years, scientists have engaged in active studies on the physical properties of thin films in which two different materials form alternating ultrathin layers. Some of these studies have considered the magneto-optical approaches, as described, for example, in Katayama et al., The Proceedings of International Symposium on Physics of Magnetic Materials, 1987, p. 283; and Togami et al., The Proceedings of International Symposium on Physics of Magnetic Materials, 1987, p. 275). However, no magneto-optical thin film has yet been proposed that attains useful results such as an improvement in magneto-optical effects.

As already mentioned, thin films of amorphous alloys of the rare earth/transition metal system which are presently considered to be the best for use as ferromagnetic thin films in magneto-optical recording media have small Kerr rotation angles. In order to solve this problem, the Kerr rotation angles ($\theta k$) of these films are increased by laminating them to dielectric layers whose thickness is adjusted to satisfy a near non-reflection condition. However, the reflectance of such laminates is then reduced. In magneto-optical recording, the play back signal to noise ratio is generally proportional to $\sqrt{R}\theta k$ (R:reflectance), so reduction in reflectance is not desirable. Because of this problem, the magneto-optical thin films available today fall short of attaining commercially satisfactory C/N (carrier to noise) ratio. Therefore, a strong need exists for a magneto-optical thin film having a value of $\sqrt{R}\theta k$ higher than those current available.

SUMMARY OF THE INVENTION

An object, therefore, of the present invention is to provide a magneto-optical thin film that is enhanced in Kerr rotation angle without experiencing a substantial reduction in reflectance.

This and other objects and effects of the present invention will be apparent from the following description.

These objects of the present invention can be attained by a magneto-optical thin film comprising a substrate having thereon at least two ferromagnetic thin layers alternately with at least two dielectric thin layers to form a laminate, and the ferromagnetic thin layers each has a thickness of from 30 to 260 Å.

For attaining the above-stated object more effectively, the thickness of each ferromagnetic layer is preferably adjusted to the range of from 80 to 160 Å.

In another preferred embodiment, the dielectric layers are made of a material in which the real part of refractive index is 2.5 or less and the imaginary part of refractive index is 0.2 or less, and more preferably the real part is 2.1 or less and the imaginary part is 0.1 or less.

In still another preferred embodiment, the ferromagnetic thin layers each is made of an amorphous alloy of a system consisting of a rare earth metal and a transition metal, and the dielectric thin layers each is made of a material selected from the group consisting of nitrides, sulfides and fluorides.

DETAILED DESCRIPTION OF THE INVENTION

Figure 1:
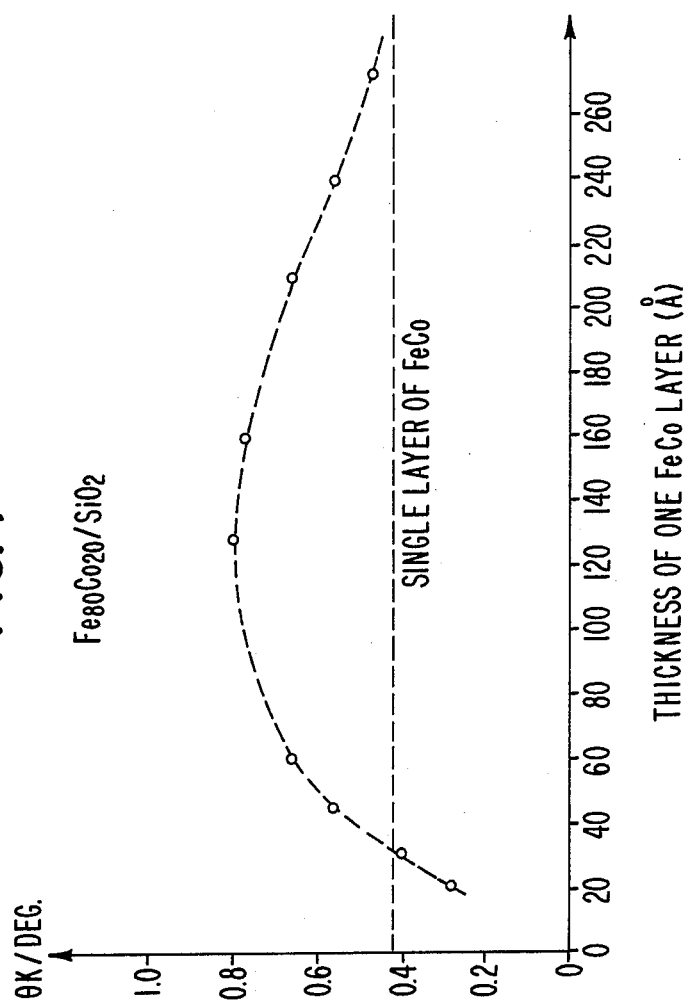
FIG. 1 is a graph showing the dependency of Kerr rotation angle on the thickness of one layer of FeCo in a laminated film in which $Fe_{80}Co_{20}$ layers alternate with $SiO_2$ layers.

The magneto-optical thin film of the present invention comprises two or more ferromagnetic thin layers that are layered alternately with two or more dielectric thin layers to form a laminated on a substrate. It is characterized by enhanced magneto-optical effects that are attained by the composite effects created between adjacent layers. The magneto-optical thin film of the present invention has a larger Kerr rotation angle ($\theta k$) than a film made solely from one ferromagnetic thin layer and one dielectric thin layer. Moreover, it does not demonstrate any noticeable drop in reflectance (R). As a result, there is achieved an increase in $\sqrt{R}\theta k$ which is proportional to C/N in magneto-optical recording. The values of $\theta k$ and $\sqrt{R}\theta k$ are dependent on the thickness of each ferromagnetic layer and attains a maximum at a certain value of thickness. The thickness of each ferromagnetic layer is within the range of from 30 to 260 Å, preferably from 80 to 160 Å. If the thickness of each ferromagnetic layer is smaller than 30 Å, its ferromagnetism will deteriorate. If the thickness of each ferromagnetic layer exceeds 260 Å, the enhancing effect of the resulting magneto-optical thin film is too small to provide a desired Kerr rotation angle ($\theta k$).

The ferromagnetic thin layers may be made of a material selected from among ferromagnetic metals such as Fe, Co and Ni, alloys based on these metals, intermetallic compounds or alloys such as MnBi, MnAl, MnPtSb and PtCo, amorphous alloys of rare earth/transition metal system such as TbFeCo and NbDyFeCo, and ferromagnetic oxides such as spinel ferrite, hexagonal ferrite and iron garnet.

Among the above materials for the ferromagnetic thin layers, Fe, Co, alloys based on Fe and/or Co, amorphous alloys of rare earth/transition metal system, iron garnet and cobalt ferrite are preferred; FeCo alloys, TbFeCo alloys, DyFeCo alloys and iron garnet are more preferred; and TbFeCo alloys and DyFeCo alloys are most preferred.

The dielectric thin layers may be made of a material selected from among oxides, nitrides, fluorides and sulfides such as $SiO_2$, $Si_3N_4$, $AlN$, $Al_2O_3$, $MgO$, $MgF_2$, $TiO_2$, $TiN$, $Bi_2O_3$, $ZnS$, $ZrO_2$, etc.

Among these materials for the dielectric thin layers, $SiO_2$, $Si_3N_4$, $MgO$, $MgF_2$ and $ZnS$ are preferred; and $MgF_2$, $ZnS$, $Si_3N_4$ and $SiO_2$ are more preferred.

The enhancement in $\theta k$ which is the most important aspect of the present invention depends on the complex refractive index n, k, (n: real part, k: imaginary part) of the dielectric material used. A dielectric material wherein $n \leq 2.5$ and $k \leq 0.2$ is preferably selected for the dielectric thin layers, and more preferably, a material wherein $n \leq 2.1$ and $k \leq 0.1$ is used.

When the ferromagnetic thin layers are formed of easily oxidizable materials such as rare earth metals, the use of oxides as dielectric materials will sometimes cause deterioration of the ferromagnetic thin layers and, therefore, the use of nitrides or fluorides rather than oxides is recommended for the dielectric thin layers. The thickness of each dielectric thin layer is preferably within the range of 30 to 500 Å, and more preferably within the range of from 50 to 250 Å.

The total thickness of the magneto-optical thin film of the present invention excepting the substrate is preferably within the range of from 300 to 5,000 Å, and more preferably within the range of from 300 to 2,000 Å.

In accordance with the present invention, a magneto-optical thin film is formed from a laminate in which ferromagnetic thin layers are layered alternately with dielectric thin layers on a substrate. One of the ferromagnetic thin layers may be placed directly on the substrate, or a dielectric layer may be interposed between the ferromagnetic layer and the substrate.

The substrate for use in the present invention may be made of a material such as glass or plastics (e.g., polymethyl methacrylate, polycarbonate and epoxy resins) that has a high transmittance of recording/reproducing light. The substrate may also be made of a metal such as aluminum or duralumin.

Among these materials for the substrate, glass, polycarbonate and polymethyl methacrylate are preferred; and glass and polycarbonate are more preferred.

The magneto-optical thin film of the present invention may be formed by sputtering, vacuum evaporation or any other conventional thin-film processes.

The simplest design of sputtering apparatus for use in the fabrication of the magneto-optical thin film of the present invention permits targets of ferromagnetic material and dielectric material are simultaneously sputtered by a DC or RF method, with a substrate holder being rotated to allow substrates to pass successively over or beneath the targets. The sputtering cathode is preferably of the magnetron type. The thicknesses of each ferromagnetic or dielectric thin layer to be formed on the substrate can be controlled by adjusting the power to be supplied to the magnetron and the rotational speed of the substrate holder.

The magneto-optical thin film according to the present invention may further be provided with a protective layer and a reflective layer on or under the laminate.

The reflective layer may be a thin layer of metals such as Al, Ir and Cr which is provided on the uppermost layer of the laminate of the magneto-optical thin film of the present invention.

The protective layer may comprise a polymer, a dielectric material or the like, and may be provided on or under the laminate or on the above-mentioned reflective layer.

In accordance with the present invention, the Kerr rotation angle ($\theta k$) of a magneto-optical thin film can be increased without causing a substantial decrease in reflectance if the thickness of each of the ferromagnetic thin layers in the film is adjusted to be within the range of 30 to 260 Å.

The use of ferromagnetic layers which are ultrathin offers an additional advantage in that they can be formed with grain growth being suppressed, which is not the case of conventional ferromagnetic layers. This permits the use of polycrystalline materials in the formation of ferromagnetic layers without causing unacceptable levels of grain-boundary noise in magneto-optical recording media. Therefore, in accordance with the present invention, a magneto-optical recording medium having an improved signal/noise ratio can be produced using MnBi, PtCo and other constituent materials that will inherently produce high levels of grain-boundary noise.

Figure 3:
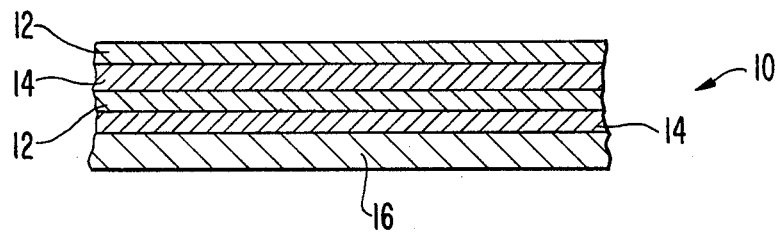
FIG. 3 illustrates a thin film according to the present invention wherein two dielectric layers are positioned alternately with two ferromagnetic layers.

FIG. 3 illustrates a magneto-optical thin film 10 according to the present invention including two dielectric layers 12 alternately laminated with two ferromagnetic layers 14 on a substrate 16. As discussed above, either a ferromagnetic layer 14 as shown or a dielectric layers 12 may be placed directly on the substrate.

The following examples are provided for the purpose of further illustrating this novel feature of the present invention, but the present invention is not construed as being limited thereto.

EXAMPLE 1

A thin film was prepared by sputtering in an apparatus of the magnetron type, with the chamber being initially evacuated $2 \times 10^{-7}$ Torr and argon gas supplied during the sputtering process to maintain a pressure of $3 \times 10^{-3}$ Torr. Kerr rotation angle measurements were conducted with a laser beam ($\lambda = 830$ nm) being directed against the glass substrate in a magnetic field of 15 kOe that was applied in a direction normal to the film surface. The values of $\theta k$ were obtained by subtracting from the measured values the component due to the Faraday effect of glass.

The dependency of $\theta k$ on the thickness of an FeCo layer was determined by changing the power input to a target of $Fe_{80}Co_{20}$ with the thickness of a $SiO_2$ layer being fixed by holding the power input to a $SiO_2$ target constant in the range of 300 to 800 W and with the substrate holder being rotated at 1 rpm. The results are shown in FIG. 1, which shows the dependency of θk on the thickness of FeCo layer wherein the thickness of the SiO₂ layer is adjusted to 100 Å. The film-forming time was so adjusted as to provide a total film thickness excepting the substrate of 2,000 Å. FIG. 1 also shows the measured values of θk of a single layer of FeCo that was formed with the same apparatus as that employed in the fabrication of the laminated film.

As will be apparent from FIG. 1, the laminated film showed larger θk values than the single layer of FeCo when the thickness of one FeCo layer was within the range of 30 to 260 Å, and a maximum value was attained in the range of 80 to 160 Å. Although not shown in FIG. 1, the maximum value of θk had a tendency to increase as the thickness of one SiO₂ layer increased.

Using the same apparatus, a single layer of Sio₂ was formed in a thickness of 2,000 Å and its complex refractive index (n−ik) was measured with an ellipsometer. The results were as follows: n=1.5 and k=0.05.

Reflectance (R) measurements were performed both on the single layer of FeCo and typical samples of the laminated film fabricated in Example 1. The results are shown in Table 1 which also shows the values of $\sqrt{R}\theta k$, or the figure of merit, of the samples estimated.

TABLE 1

| Thickness of FeCo layer (Å) | Thickness of SiO₂ layer (Å) | R (%) | θk (deg) | $\sqrt{R}\,\theta k$ (arbitrary unit) |
|---|---|---|---|---|
| 46 | 100 | 40 | 0.56 | 3.5 |
| 60 | 100 | 48 | 0.66 | 4.6 |
| 130 | 100 | 52 | 0.80 | 5.8 |
| 160 | 100 | 52 | 0.78 | 5.6 |
| 210 | 100 | 51 | 0.67 | 4.8 |
| 240 | 100 | 53 | 0.56 | 4.1 |
| Single FeCo layer | | 54 | 0.42 | 3.1 |

As Table 1 shows, the samples of the magneto-optical thin film of the present invention attained remarkable improvements in the figure of merit because they had increased Kerr rotation angles without a substantial decrease in reflectance.

EXAMPLE 2

Figure 2:
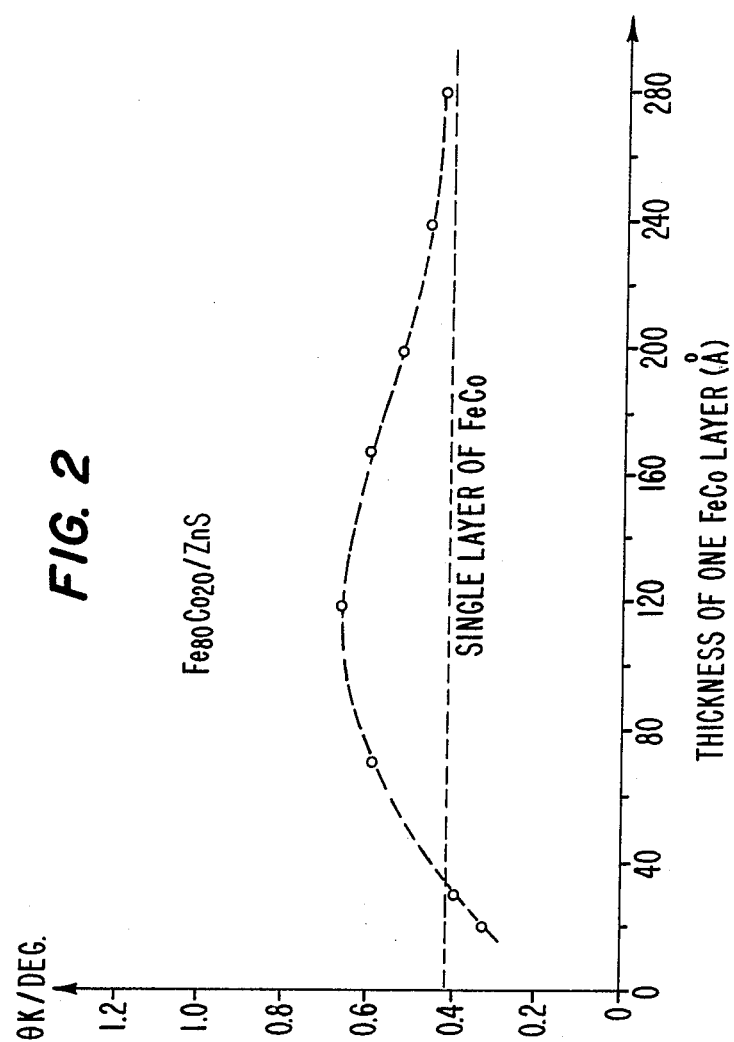
FIG. 2 is a graph showing the dependency of Kerr rotation angle on the thickness of one layer of FeCo in a laminated film in which $Fe_{80}Co_{20}$ layers alternate with ZnS layers.

The dependency of θk on the thickness of FeCo layer was investigated by changing the power input to a target of Fe₈₀Co₂₀ with the thickness of a ZnS layer being fixed by holding the power input to a ZnS target constant in the range of 200 to 600 W and with the substrate holder being rotated at 1 rpm. The other operating conditions were the same as those employed in Example 1. The results are shown in FIG. 2, which shows the dependency of θk on the thickness of FeCo layer wherein the thickness of a ZnS layer is adjusted to 50 Å. The film-forming time was so adjusted that the total thickness of FeCo layers would be 2,000 Å. FIG. 2 also shows the measured values of θk of a single layer of FeCo that was formed with the same apparatus as that employed in the fabrication of the laminated film.

As is apparent from FIG. 2, the laminated film showed larger θk values than the single layer of FeCo when the thickness of one FeCo layer was within the range of 30 to 260 Å, and a maximum value was attained in the range of 80 to 160 Å altough it was lower than the value attained in Example 1. The dependency of the maximum value of θk on the thickness of one ZnS layer was such that it increased as the thickness a ZnS layer decreased.

Using the same apparatus, a single layer of ZnS was formed in a thickness of 2,000 Å and its complex refractive index (n−ik) was measured with an ellipsometer. The results were as follows: n=2.3 and k=0.1.

EXAMPLE 3

The dependency of θk on the thickness of a TbFeCo layer was investigated by changing the power input to a target of $Tb_{25}(Fe_{90}Co_{10})_{75}$ alloy, with the thickness of a ZnS layer being fixed at either 50 Å or 150 Å by holding the power input to a ZnS target constant in the range of 200 to 600 W and with the substrate holder being rotated at 1 rpm. The film-forming time was so adjusted that the total thickness of TbFeCo layers would be 2,000 Å. The other operating conditions were the same as those employed in Example 1. As in Example 1, the laminated film showed larger θk values than the single layer of TbFeCo when the thickness of one TbFeCo layer was within the range of 30 to 260 Å, and a maximum value was attained in the range of 80 to 160 Å. As in Example 2, the dependency of the maximum value of θk on the thickness of one ZnS layer was such that it increased as the thickness of a ZnS layer decreased.

Using the same apparatus, a single layer of ZnS was formed in a thickness of 2,000 Å and its complex refractive index (n−ik) was measured with an ellipsometer. The results were as follows: n=2.3 and k=0.1.

EXAMPLE 4

The dependency of θk on the thickness of a TbFeCo layer was investigated by changing the power input to a target of $Tb_{25}(Fe_{90}Co_{10})_{75}$ alloy, with the thickness of a MgF₂ layer being fixed at 50 Å, 100 Å or 150 Å by holding the power input to a MgF₂ target constant in the range of 200 to 600 W and with the substrate holder being rotated at 1 rpm. The film-forming time was so adjusted that the total thickness of TbFeCo layers would be 2,000 Å.

As in Example 3, the laminated film showed larger θk values then the single layer of TbFeCo when the thickness of one TbFeCo layer was within the range of 30 to 260 Å, and a maximum value was attained in the range of 80 to 160 Å. However, the dependency of the maximum value of θk on the thickness of one MgF₂ layer was not the same as in Example 3 and it occurred in the thicker range of MgF₂ layer, showing the same tendency as in Example 1. In addition, the maximum value of θk attained was larger than that observed in Example 3.

Using the same apparatus, a single layer of MgF₂ was formed in a thickness of 2,000 Å and its complex refractive index (n−ik) was measured with an ellipsometer. The results were as follows: n=1.5 and k=0.05.

A typical example of the laminated film prepared in Example 4 (100 Å TbFeCo/100 Å MgF₂) was found to have a reflectance (R) of 40%. This sample had a Kerr rotation angle of 0.6 degrees.

COMPARATIVE EXAMPLE

Using the same apparatus as that employed in Examples 1 to 4, a film having the known enhancing structure of TbFeCo/Si₃N₄/substrate was fabricated on a glass substrate. The thin layers of TbFeCo and Si₃N₄ were 1,200 Å and 1,500 Å, respectively. In the experiment, the thickness of the enhanced film was so adjusted that the Kerr rotation angle as measured with laser light directed against the glass substrate would be 0.6 degrees as in the typical sample of the present invention prepared in Example 4. This film was found to have a reflectance of 30%.

The results of the comparative example clearly demonstrate that the magneto-optical thin film of the present invention has a higher reflectance than a conventional film of the enhancing structure that provides the same Kerr rotation angle. In other words, the thin film of the present invention has a higher value of the figure of merit.

One will also be able to understand from the results of Examples 1 to 4 that in order to improve the figure of merit of a magneto-optical thin film as intended by the present invention, the dielectric material used as the constituent material of ultra-thin dielectric layers preferably should not have large values of reflective index and attenuation factor; the intended advantages of the present invention will effectively be attained if $n \leq 2.5$ and $k \leq 0.2$, and more effectively be attained if $n \leq 2.1$ and $k \leq 0.1$.

While the invention has been described in detail and with reference to specific embodiments thereof, it will be apparent to one skilled in the art that various changes and modifications can be made therein without departing from the spirit and scope thereof.

What is claimed is:

1. A magneto-optical recording medium including an ultrathin magneto-optical film capable of attaining a commercially satisfactory carrier to noise (C/N) ratio and having an improved figure of merit so that the Kerr rotation angle is enhanced while the reflectance is not substantially reduced, wherein said thin film comprises a substrate supporting a laminate formed of at least two ferromagnetic alloy thin layers, each of said layers having a thickness of from 30 to 260 Å alternately layered with at least two dielectric thin layers each having a thickness of from 30 to 500 Å and made of a material with a complex refractive index, wherein the real part of said index is 2.5 or less and the imaginary part of said index is 0.2 or less, and the total thickness of said laminate is from 300 to 2000 Å.

2. A magneto-optical thin film as claimed in claim 1, wherein said ferromagnetic thin layers each has a thickness of from 80 to 160 Å.

3. A magneto-optical thin film as claimed in claim 1, wherein said dielectric thin layers each is made of a material having a real part of complex refractive index of 2.1 or less and the imaginary factor of 0.1 or less.

4. A magneto-optical thin film as claimed in claim 1, wherein said ferromagnetic thin layers each is made of an amorphous alloy of a system consisting of a rare earth metal and a transition metal, and said dielectric thin layers each is made of a material selected from the group consisting of nitrides, sulfides and fluorides.

5. A magneto-optical thin film as claimed in claim 4, wherein said ferromagnetic thin layers each is made of TbFeCo alloys and DyFeCo alloys.

6. A magneto-optical thin film as claimed in claim 4, wherein said dielectric thin layers each is made of $Si_3N_4$, $ZnS$ or $MgF_2$.

7. A magneto-optical recording medium as described in claim 1, wherein the thickness of each said dielectric thin layer is within the range from 50 to 250 Å.

* * * * *